United States Patent
Endoh

(10) Patent No.: US 9,126,527 B2
(45) Date of Patent: Sep. 8, 2015

(54) INSTRUMENT FOR VEHICLE

(75) Inventor: Masahiro Endoh, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 265 days.

(21) Appl. No.: 13/981,853

(22) PCT Filed: Jan. 12, 2012

(86) PCT No.: PCT/JP2012/050437
§ 371 (c)(1),
(2), (4) Date: Jul. 25, 2013

(87) PCT Pub. No.: WO2012/102084
PCT Pub. Date: Aug. 2, 2012

(65) Prior Publication Data
US 2013/0307410 A1 Nov. 21, 2013

(30) Foreign Application Priority Data
Jan. 25, 2011 (JP) .................................. 2011-012448

(51) Int. Cl.
| | | |
|---|---|---|
| *B60Q 1/14* | (2006.01) | |
| *B60Q 1/00* | (2006.01) | |
| *G01D 11/28* | (2006.01) | |
| *B60K 35/00* | (2006.01) | |
| *B60K 37/02* | (2006.01) | |

(Continued)

(52) U.S. Cl.
CPC .............. *B60Q 1/0064* (2013.01); *B60K 35/00* (2013.01); *B60K 37/02* (2013.01); *G01D 11/28* (2013.01); *B60K 2350/203* (2013.01); *B60K 2350/352* (2013.01); *B60Q 3/0293* (2013.01); *B60Q 3/046* (2013.01)

(58) Field of Classification Search
None
See application file for complete search history.

(56) References Cited

U.S. PATENT DOCUMENTS 4,324,986 A * 4/1982 Hara et al. ................... 315/77
4,786,843 A * 11/1988 Yamamoto et al. ........... 315/77

(Continued)

FOREIGN PATENT DOCUMENTS

| JP | 2002-158574 A | 5/2002 |
|---|---|---|
| JP | 2003-191771 A | 7/2003 |

(Continued)

OTHER PUBLICATIONS

International Search Report issued in International Applicatiomn No. PCT/JP2012/050437 mailed Feb. 14, 2012.

*Primary Examiner* — Tuan T Lam
(74) *Attorney, Agent, or Firm* — McDermott Will & Emery LLP

(57) ABSTRACT

A vehicle instrument configured so that turning on and off the light sources without depending on inputted vehicle information enables the instrument to be illuminated in a visually effective manner. The instrument is provided with: input circuits into which vehicle information is inputted as electric signals and which are provided with resistors connected to light sources relating to the vehicle information; electric-potential adjustment circuits for adjusting the electric potentials of lines of wiring between the input circuits and the light sources on the basis of control signals from a controller and eliminating influence on the light sources from the vehicle information; and light source control circuits which, when influence on the light sources is eliminated by the electric-potential adjustment circuits, operate and visualize turning on and off of the light sources on basis of the control signals from the controller.

4 Claims, 3 Drawing Sheets

(51) Int. Cl.
    *B60Q 3/02*    (2006.01)
    *B60Q 3/04*    (2006.01)

(56)    References Cited

U.S. PATENT DOCUMENTS

| | | | |
|---|---|---|---|
| 5,453,731 A * | 9/1995 | Beyer | 340/438 |
| 5,896,010 A * | 4/1999 | Mikolajczak et al. | 315/77 |
| 5,998,928 A * | 12/1999 | Hipp | 315/77 |
| 8,600,616 B2 * | 12/2013 | Aragai et al. | 701/36 |
| 2005/0047031 A1 * | 3/2005 | Naito | 361/18 |
| 2012/0056736 A1 * | 3/2012 | Katoh | 340/439 |

FOREIGN PATENT DOCUMENTS

| | | |
|---|---|---|
| JP | 2004-245755 A | 9/2004 |
| JP | 2004-264196 A | 9/2004 |
| JP | 2005-308895 A | 11/2005 |
| JP | 2006-103566 A | 4/2006 |
| WO | WO 2010/067804 * | 6/2010 |

* cited by examiner

INSTRUMENT FOR VEHICLE

RELATED APPLICATIONS

This application is the U.S. National Phase under 35 U.S.C. §371 of International Application No. PCT/JP2012/050437, filed on Jan. 12, 2012, which in turn claims the benefit of Japanese Application No. 2011-012448, filed on Jan. 25, 2011, the disclosures of which Applications are incorporated by reference herein.

TECHNICAL FIELD

The present invention relates to an instrument for a vehicle having control means for controlling a display device including a light source, based on information of a sensor or the like which is installed in a vehicle.

BACKGROUND ART

For example, as an instrument for a vehicle that displays various information regarding a vehicle (hereinafter, referred to as vehicle information), such as vehicle speed, engine revolutions per minute, water temperature and hydraulic pressure, an instrument for a vehicle is known which has a pointer display type instrument that displays a measure and which shows the vehicle information by rotating a pointer installed in a driving body on a display board, and there is a combination meter whose case body contains a speedometer or a tachometer and a fuel gauge.

The instrument for a vehicle requires a novel design, and it is known that the instrument for a vehicle performs a directing operation (non-display operation) different from a display of the vehicle information, according to a manipulation of an ignition switch (power supply switch) of the vehicle. For example, in the directing operation, the pointer performs an operation to return to a zero point position after the pointer is rotated from the zero point position to a highest scale position along a display board scale, or dedicated illumination sources are included respectively in the pointer and a dial, and the illumination sources are lighted up in different lighting time with each other according to a switching ON state of the IGN switch. Such an instrument for a vehicle is disclosed in PTL 1, for example.

CITATION LIST

Patent Literature

[PTL 1] JP-A-2004-245755

SUMMARY OF INVENTION

Technical Problem

However, there is a problem that since the above-described instrument for a vehicle requires time to start after an ignition switch is turned on, until the instrument for a vehicle is started to perform directing operation, vehicle information is input based on a sensor, a switch or the like which is installed in a vehicle, and display is performed based on the vehicle information. Therefore it is not possible to perform an effective directing operation.

For example, in a specification in which the directing operation is performed by sequentially blinking an indicator or an alarm lamp, as well as a pointer or a dial, in a case where a headlight is in a lighting up state and the indicator is in a lighting up state based on that, or in a case where the alarm lamp is in a lighting up state based on any alarm information, there is a problem that the lighting up is not performed in an intended lighting up order or that display change during the directing operation is not highlighted.

Therefore, an object of the present invention is focused on the above-described problem, and to provide an instrument for a vehicle which can perform an effective illumination direction, by driving lighting up/off of a light source without depending on input vehicle information.

Solution to Problem

An instrument for a vehicle of the present invention having a light source whose lighting up/off is switched based on an input of vehicle information, and control means that controls the light source so as to perform a directing operation regardless of the input of the vehicle information, based on a manipulation state of a power supply switch, includes an input circuit which receives the vehicle information as an electric signal, and includes a resistor connected to the light source related to the vehicle information; an electric potential adjustment circuit that adjusts a potential of a line of wiring between the light source and the input circuit, based on a control signal from the control means, and invalidates an effect on the light source from the vehicle information; and a light source control circuit that performs a directing operation by controlling the lighting up/off of the light source, based on a control signal from the control means, when the effect on the light source is invalidated by the electric potential adjustment circuit.

In addition, the control means outputs the control signal so as to control the electric potential adjustment circuit and the light source control circuit only for a predetermined time, in a case where the power supply switch is manipulated from an OFF state to an ON state.

In addition, the control means outputs the control signal so as to control the electric potential adjustment circuit and the light source control circuit, so as to perform the directing operation only for a predetermined time, before the instrument for a vehicle is stopped, in a case where the power supply switch is manipulated from the ON state to the OFF state.

Advantageous Effects of Invention

The present invention relates to an instrument for a vehicle that has a light source which is lighted up/off based on an input of vehicle information, and control means which controls the light source so as to perform a directing operation regardless of the input of the vehicle information, based on a manipulation state of a power supply switch, and an effective illumination direction can be performed by driving lighting up/off of the light source without depending on the input vehicle information.

DESCRIPTION OF EMBODIMENTS

Figure 1:
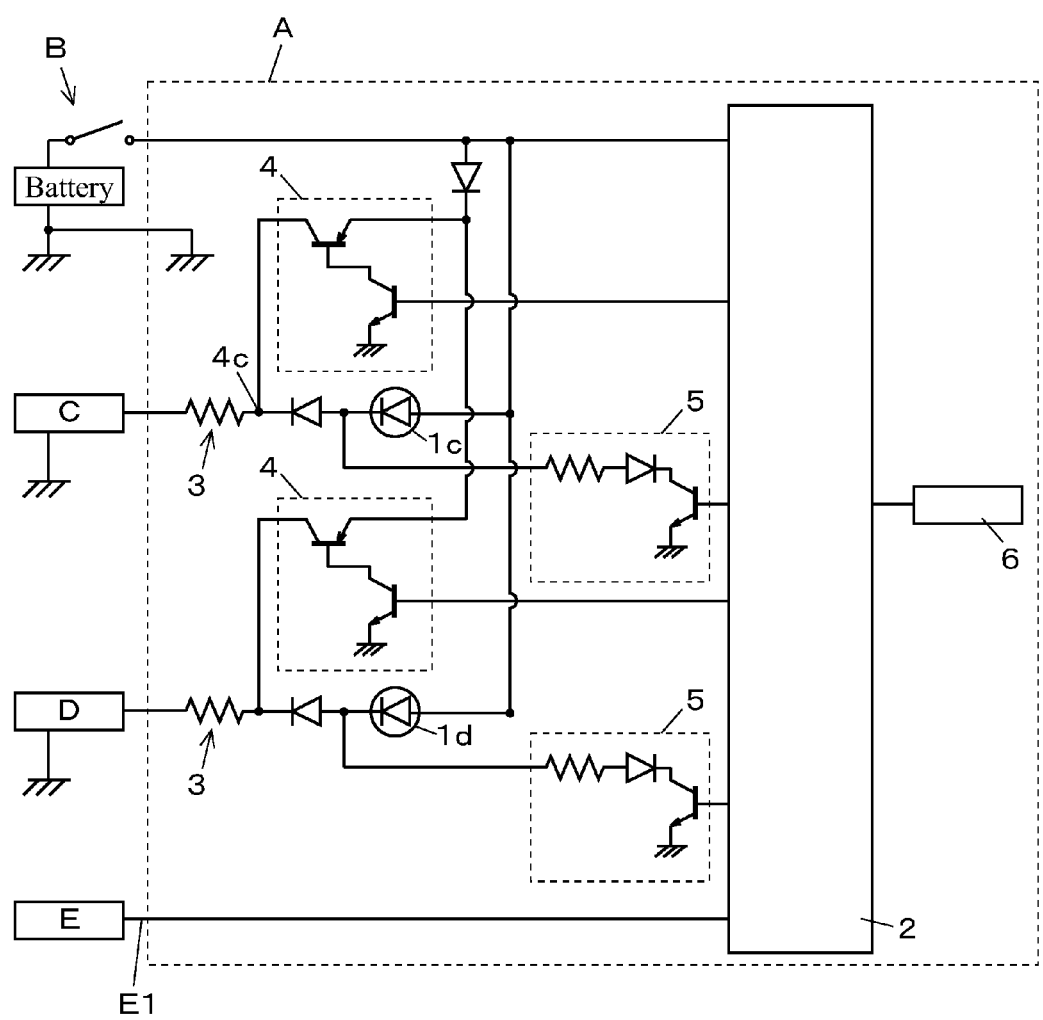
FIG. 1 is a view illustrating an electrical configuration according to an embodiment of the present invention.

Hereinafter, an embodiment to which the present invention is applied will be described with reference to the accompanying drawings.

A two-wheeled vehicle in which an instrument for a vehicle of the present invention is installed will be described as an embodiment. As described in FIG. 1, the instrument for a vehicle A includes a circuit board on which light sources 1c and 1d, control means 2, input circuits 3, electric potential adjustment circuits 4, light source control circuits 5, and a display unit 6 are installed. The instrument for a vehicle A is electrically connected via unillustrated cables to a power supply switch unit B, an engine unit C, a gear unit D and the like which are installed in the vehicle, and can receive vehicle information such as a manipulation state by a vehicle user or an alarm state.

For example, the light sources 1c and 1d can adopt light emitting diodes used as backlight of various alarm lamps or indicators, and perform a display output of alarm content or mark of a predetermined shape using transmitted light of a dial. In this case, multiple light sources are installed as the light source 1c of backlight for an engine abnormality alarm lamp connected in series to the engine unit C, and as the light source 1d of backlight for a gear position indicator connected in series to the gear unit.

For example, the control means 2 can adopt a microcomputer and includes a CPU for arithmetically processing based on various input signals, a storing unit configured by a RAM which temporarily stores results or the like arithmetically processed in the CPU and can be read or rewritten, or a ROM which stores a control program or control data, and a bus-connected input and output interface for exchanging the various input signals, a control signal, a clock signal or the like.

The control means 2 is connected to an external unit E via a communication cable E1 so that a signal (vehicle information) from the power supply switch unit B configured by a battery and an ignition switch, or other various signals can be input. In addition, as a general processing during a vehicle travel or the like, the control means 2 receives various vehicle signals (vehicle information) such as a travel signal or an engine revolutions per minute signal according to a travel speed of the vehicle, generates a control signal according to those signals, and outputs the control signal to the display unit 6, thus enabling control so that a measurement value such as vehicle speed or engine revolutions per minute can be output to be displayed on the display unit 6.

The input circuits 3 receive the vehicle information as electric signals, and are configured to include resistors connected in series to the light sources 1c and 1d related to the vehicle information. For example, the input circuit 3 receives a signal which shows an alarm state from an engine unit C, and can drive (lighting up/off) the light source 1c which is the backlight of the engine abnormality alarm lamp, according to a voltage level of the signal. When the instrument for a vehicle A performs a general operation, the vehicle user can confirm whether there is any abnormality in the engine when the alarm lamp is lighted up.

The electric potential adjustment circuits 4 adjust potentials of lines of wiring between the light sources 1c and 1d and the input circuits 3, according to control signals output from the control means 2, and are circuits to eliminate influence on the light sources 1c and 1d from the electric signals (vehicle information). For example, in case of a specification where the light source 1c is lighted up by an electric signal from the engine unit C being an L level, and the light source 1c is lighted off by the electric signal being an H level, a potential of line of wiring 4c (output side of the electric potential adjustment circuit 4) between the light source 1c and the input circuit 3 is forcibly fixed to an H level, and thereby the electric signal can be invalidated. In this case, the engine unit C is grounded, an input circuit 2 side is a specification of a lower potential than that of the light source 1c, and the electrical potential adjustment circuit 4, as illustrated in FIG. 1, is provided to adjust the potential of the light source 1c by using a power supply from the power supply switch unit B, and the control signal from the control means 2 by connecting two transistors to each other. In addition, the electric potential adjustment circuit 4 is considered to be replaced with a switching element such as an FET instead of the two transistors.

The light source control circuit 5 is configured so as to be driven based on the control signal from the control means 2, and is a circuit for switching the lighting up/off of the light source 1c, when the electric signal is invalidated by the electric potential adjustment circuit 4, as described above. In this case, the light source control circuit 5, as illustrated in FIG. 1, is configured by a transistor, a diode and a resistor, and can control the lighting up of the light source 1c by grounding an end side (cathode side) of the light source 1c, based on the control signal from the control means 2. In addition, the light source control circuit 5 can be configured by the above-described microcomputer.

In addition, although a circuit configuration related to the engine unit D is exemplified, the input circuit 3, the electric potential adjustment circuit 4 and the light source control circuit 5 are also connected to the light source 1d with respect to the gear unit D as well as the engine unit D, and can be configured so as to drive the light source 1d for the gear position indicator, based on a signal from the gear unit D. In addition, one gear position indicator is illustrated in the drawing, but multiple circuits similar to one another can be provided for each type of gears.

The display unit 6 is provided in a position where the vehicle user in the vehicle can view the instrument for a vehicle A, and is an interface for informing the vehicle user of the vehicle information, based on the control signal from the control means 2. The display unit 6 can adopt a liquid crystal display panel or an organic EL panel that includes a driving driver, and displays the vehicle information such as total accumulated travel distance display or section travel distance display, a vehicle outside temperature, and gas mileage with a gauge, a numeric value, or the like by switching each other.

In addition, the display unit 6 may be controlled to be displayed by the control means 2. For example, the display unit 6 may be a so-called analog instrument which performs contrast reading of a measurement value, in which the alarm lamp or the indicator which displays the lighting up by using the backlight light source such as the light emitting diode as same as the above description, or the pointer which rotates based on the control signal using a motor as a driving source, and an index such as a scale which is a pointing target of the pointer or a numeric value are provided, and may be one which performs a mimic display of the analog instrument on a liquid crystal panel.

Figure 2:
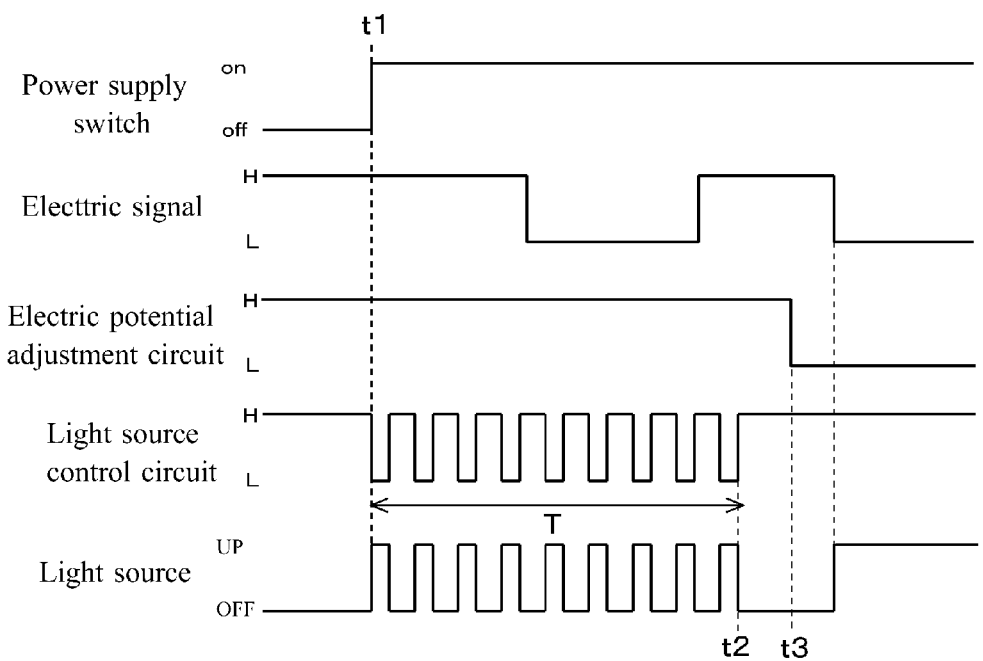
FIG. 2 is a view illustrating an example of waves according to a control of the embodiment of the present invention.

Next, an output example of each circuit based on a signal from the power supply switch unit B and the engine unit C related to the present invention will be described by using a timing chart illustrated in FIG. 2.

The control means 2 monitors whether or not the power supply switch is transitioned from an OFF state to an ON state, invalidates an input of an electric signal by using the electric potential adjustment circuit 4 after or before a time point (t1) when the power supply switch is transitioned to the ON state, performs a driving control of the light source 1c so that a predetermined blinking operation regardless of the electric signal may be performed by using the light source control circuit 5, and thereby performing a directing operation (T). In this case, the control means 2 controls so that the alarm lamp or the indicator may be driven in a predetermined order, thereby it is possible to impart dynamism to the instrument for a vehicle A. In addition, the control means can invalidate the electric signal using the electric potential adjustment circuit 4, until the directing operation is completed although the electric signal is changed, during the directing operation by a light source control using the light source control circuit 5, and can control the light source 1c so that the lighting up/off may not be performed except for the directing operation.

In addition, the control means 2 stops a potential adjustment using the electric potential adjustment circuit 4, after the directing operation using the light source control circuit 5 is completed (t2), and switches the control signal so that the lighting up/off of the light source 1c is performed based on the input of the electric signal (t3). Thus, the instrument for a vehicle A can perform a display output of general vehicle information without the directing operation. In addition, at this time, the light source 1c does not become an operational load of the control means 2, although the control using the control means 2 during a general operation is not performed, because a direct driving is performed regardless of the control using the control means 2 based on the input electric signal. In addition, the power supply of a switch of the engine unit C and the light source 1c can be provided to a common circuit, and thereby a power-saving circuit configuration is made.

Such an instrument for a vehicle A includes the light sources 1c and 1d whose lighting up/off are switched based on the input of the vehicle information, the control means 2 which controls the light sources 1c and 1d so as to perform the directing operation regardless of the input of the vehicle information based on a manipulation state of a power supply switch, receives the vehicle information as an electric signal, adjusts the potentials of the lines of wiring 4c between the light sources 1c and 1d and the input circuits 3 based on the input circuits 3 which include the resistors connected to the light sources 1c and 1d related to the vehicle information, and the control signal from the control means 2. The instrument for a vehicle A includes the electric potential adjustment circuit 4 which invalidates an influence on the light sources 1c and 1d from the vehicle information, and the light source control circuit 5 which performs the directing operation by controlling the lighting up/off of the light sources 1c and 1d, based on the control signal from the control means 2, when invalidated by the electric potential adjustment circuit 4.

Accordingly, since the lighting up/off of the light sources 1c and 1d can be driven without depending on the input vehicle information, not only an exercise operation such as intended lighting up/off of the light sources 1c and 1d can be performed, but also the lighting up using the light sources 1c and 1d is stopped except that the directing operation is performed. Thus, it is possible to highlight a display change during the directing operation, and thereby an effective illumination direction can be performed.

When the power supply switch is manipulated from the OFF state to the ON state, the control means 2 outputs the control signal so as to control the electric potential adjustment circuit 4 and the light source control circuit 5 only for a predetermined time, and thereby it is possible not only to direct the dynamism of the vehicle using a manipulation of the power supply switch but also to rapidly transition to the display of vehicle information based on input information after the directing operation.

In addition, the instrument for a vehicle of the present invention has been described by using the configuration of the above-described embodiments as an example, but the present invention is not limited to this, and it should be understood that various modifications and design alterations are possible within the scope which is not departing from the gist of the present invention, even in other configurations.

For example, in the above-described embodiments, the directing operation has been described as an example when the instrument for a vehicle A is started using the manipulation of the power supply switch, but when the instrument for a vehicle is stopped, that is, in a case where the power supply switch is manipulated from the ON state to the OFF state, before the instrument for a vehicle is stopped, the control means also can perform the directing operation of the light source by using the electric potential adjustment circuit and the light source control circuit only for a predetermined time, and can obtain the same effect as the above-described embodiments. In addition, the lighting up/off is controlled by gradually changing light emission luminance of the light source, thereby an illumination control different from a general display is made, and it is possible to perform a further effective directing operation.

Figure 3:
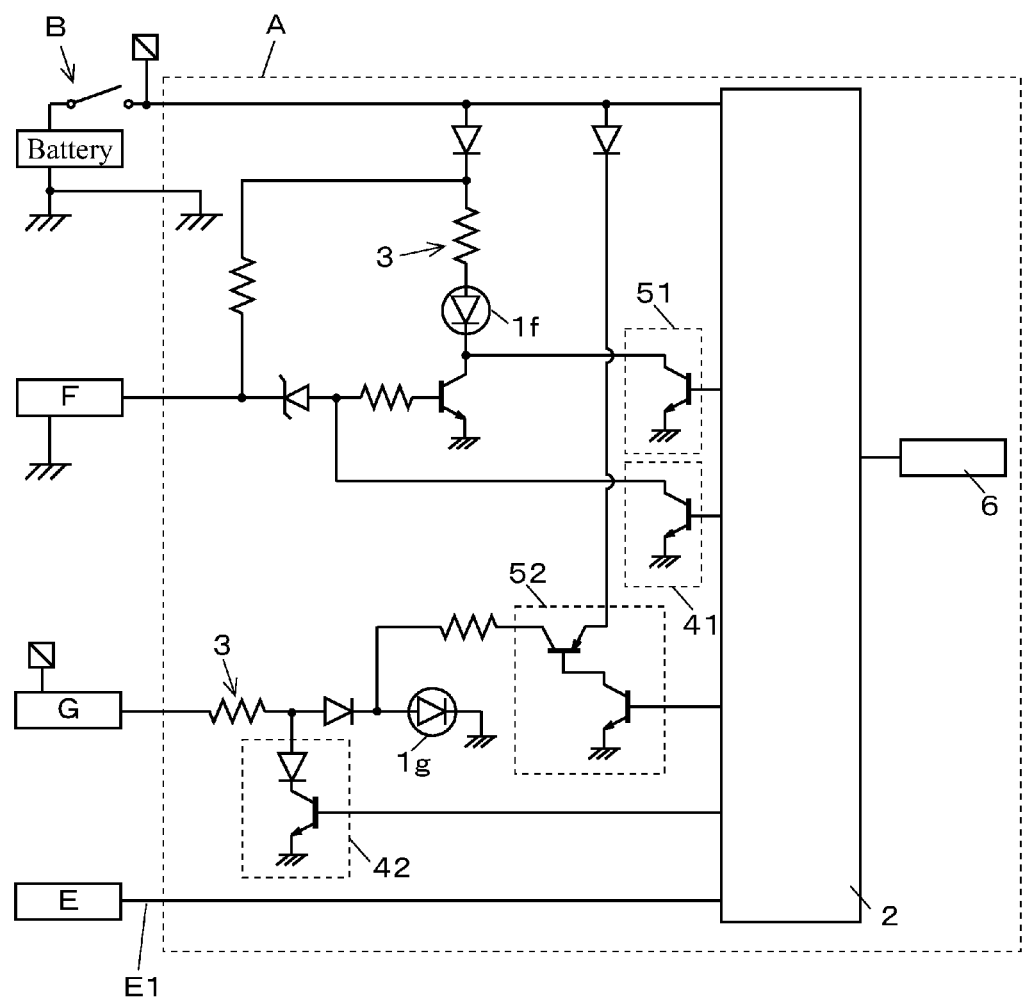
FIG. 3 is a view illustrating an electrical configuration at the time of other connection specification.

In addition, an active level of the light source is illustrated in FIG. 1 using an L level specification as a target, but may be a case where the active level is an H level, or even a specification with a different current direction, and can be realized in a circuit configuration as illustrated in a block diagram (the same sections as those in FIG. 1 are marked as the same numerals) in FIG. 3.

In FIG. 3, F is a braking control unit, for example, when an electric signal from the braking control unit F is an L level, a light source 1f for an abnormality alarm in a braking device is lighted off, and in a case of a specification where the light source 1f is lighted up during an H level, the input circuit 3, an electric potential adjustment circuit 41 and a light source control circuit 51 can be provided as illustrated in the drawing. Accordingly, the control means 2 can invalidate the electric signal from the braking control unit F during the directing operation, and can perform a driving control of the light source 1f. Thus, it is possible to obtain the same effects as the embodiment described above.

In addition, in FIG. 3, G is a headlight unit, for example, when an electric signal from the headlight unit G is an L level, it is a specification such that a light source 1g for a high beam indicator is lighted up, and in a case of a specification where the headlight unit G side is a higher potential than the light source 1g (a case of a current direction contrary to the above-described embodiment), the input circuit 3, an electric potential adjustment circuit 42 and a light source control circuit 52 can be provided as illustrated in the drawing. Accordingly, the control means 2 can invalidate the electric signal from the headlight unit G during the directing operation, and can perform a driving control of the light source 1g. Thus, it is possible to obtain the same effects as the embodiment described above.

In addition, such a circuit (the circuit illustrated in FIG. 3) and the circuit of the above-described embodiment (the circuit illustrated in FIG. 1) are considered to be provided together. In addition, in a case where the directing operation is synchronized, it is possible to commonly use the light source control means.

INDUSTRIAL APPLICABILITY

The present invention relates to the instrument for a vehicle, for example, which can be applied as an instrument for a vehicle that is installed in a vehicle, a motorcycle, or a moving object with an agricultural machine or a construction machine.

REFERENCE SIGNS LIST 1c and 1d light source
2 control means
3 input circuit
4 electric potential adjustment circuit
5 light source control circuit

The invention claimed is:

1. An instrument for a vehicle that includes a light source whose lighting up/off is switched based on an input of vehicle information, and control means that controls the light source so as to perform a directing operation regardless of the input of the vehicle information, based on a manipulation state of a power supply switch, comprising:
an input circuit which receives the vehicle information as an electric signal, and includes a resistor connected to the light source related to the vehicle information;
an electric potential adjustment circuit that adjusts a potential of a line of wiring between the light source and the input circuit, based on a control signal from the control means, and invalidates an effect on the light source from the vehicle information; and
a light source control circuit that performs a directing operation by controlling the lighting up/off of the light source, based on a control signal from the control means, when the effect on the light source is invalidated by the electric potential adjustment circuit.

2. The instrument for a vehicle according to claim 1, wherein the control means outputs the control signal so as to control the electric potential adjustment circuit and the light source control circuit only for a predetermined time, in a case where the power supply switch is manipulated from an OFF state to an ON state.

3. The instrument for a vehicle according to claim 1, wherein the control means outputs the control signal so as to control the electric potential adjustment circuit and the light source control circuit, so as to perform the directing operation only for a predetermined time, before the instrument for a vehicle is stopped, in a case where the power supply switch is manipulated from the ON state to the OFF state.

4. The instrument for a vehicle according to claim 2, wherein the control means outputs the control signal so as to control the electric potential adjustment circuit and the light source control circuit, so as to perform the directing operation only for a predetermined time, before the instrument for a vehicle is stopped, in a case where the power supply switch is manipulated from the ON state to the OFF state.

* * * * *